US011580022B2

United States Patent
Hatfield et al.

(10) Patent No.: US 11,580,022 B2
(45) Date of Patent: Feb. 14, 2023

(54) WRITE SORT MANAGEMENT IN A MULTIPLE STORAGE CONTROLLER DATA STORAGE SYSTEM

(71) Applicant: INTERNATIONAL BUSINESS MACHINES CORPORATION, Armonk, NY (US)

(72) Inventors: Brian D. Hatfield, Tucson, AZ (US); Lokesh Mohan Gupta, Tucson, AZ (US); Matthew G. Borlick, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 85 days.

(21) Appl. No.: 16/875,702

(22) Filed: May 15, 2020

(65) Prior Publication Data

US 2021/0357323 A1 Nov. 18, 2021

(51) Int. Cl.
*G06F 12/0804* (2016.01)

(52) U.S. Cl.
CPC .... *G06F 12/0804* (2013.01); *G06F 2212/608* (2013.01)

(58) Field of Classification Search
CPC ...... G06F 3/061; G06F 3/0619; G06F 3/0653; G06F 3/0659; G06F 3/0683; G06F 12/0804; G06F 2212/608
See application file for complete search history.

(56) References Cited

U.S. PATENT DOCUMENTS 6,564,304 B1 * 5/2003 Van Hook ........... G06F 13/1626
710/39
7,574,556 B2 8/2009 Gill et al.
(Continued)

FOREIGN PATENT DOCUMENTS

CN 105068768 A 11/2015
CN 106527974 A 3/2017
(Continued)

OTHER PUBLICATIONS

Wikipedia, "Binary Search Algorithm", [online], [Last edited on Aug. 14, 2018], retrieved from the Internet at <URL: https://en.wikipedia.org/w/index.php?title=Binary_search_algorithm&oldid=854879077>, 8 pp.

(Continued)

*Primary Examiner* — Prasith Thammavong
(74) *Attorney, Agent, or Firm* — Konrad Raynes Davda & Victor LLP; William K. Konrad

(57) ABSTRACT

In one aspect of write sort management in accordance with the present disclosure, a sort/no-sort determination is made prior to issuing to a write command to a target storage controller. The write command identifies a write data unit such track write data, for example, of a first write list of write data units to be written to storage locations of storage. The write command further identifies the storage location at which the write data unit of the first write list is to be stored. In one embodiment, the sort/no-sort determination determines whether an insertion point for an entry in a target write list is to be determined as a function of a write list search such as a logarithmic time search for a write list sort. As a result, the write list search for a write list sort, may be selectively either performed or bypassed for insertion of the target write list entry as a function of the sort/no-sort (Continued)

determination Other aspects and advantages are provided, depending upon the particular application.

25 Claims, 8 Drawing Sheets

(56) References Cited

U.S. PATENT DOCUMENTS

| | | | |
|---|---|---|---|
| 9,213,665 B2 | 12/2015 | Moyer et al. | |
| 2007/0124407 A1 | 5/2007 | Weber et al. | |
| 2007/0220200 A1 | 9/2007 | Gill et al. | |
| 2007/0220201 A1 | 9/2007 | Gill et al. | |
| 2009/0075687 A1 | 3/2009 | Hino et al. | |
| 2013/0024421 A1 | 1/2013 | Shinohara | |
| 2013/0132664 A1* | 5/2013 | Benhase | G11B 21/025 711/112 |
| 2014/0219021 A1* | 8/2014 | Trantham | G11C 7/24 365/185.04 |
| 2014/0379990 A1* | 12/2014 | Pan | G06F 12/0871 711/135 |
| 2015/0155050 A1* | 6/2015 | Trantham | G11C 16/3418 365/185.03 |
| 2016/0147469 A1 | 5/2016 | Kottomtharayil et al. | |
| 2016/0154866 A1 | 6/2016 | Teletia | |
| 2017/0010816 A1* | 1/2017 | Chen | G06F 16/2282 |
| 2017/0242798 A1 | 8/2017 | Saha et al. | |
| 2018/0225090 A1 | 8/2018 | Kaushik | |
| 2018/0300086 A1 | 10/2018 | Han et al. | |
| 2018/0356997 A1 | 12/2018 | Gorobets et al. | |
| 2019/0317909 A1* | 10/2019 | Gupta | G06F 12/0842 |
| 2020/0151065 A1 | 5/2020 | Rinaldi et al. | |
| 2021/0357117 A1 | 11/2021 | Hatfield et al. | |

FOREIGN PATENT DOCUMENTS

| | | |
|---|---|---|
| CN | 110928489 A | 3/2020 |
| CN | 110928496 A | 3/2020 |

OTHER PUBLICATIONS

Wikipedia, "B-Tree", [online], [Last edited on May 4, 2020], retrieved from the Internet at <URL: https://en.wikipedia.org/w/index.php?title=B-tree&oldid=954827221>, 14 pp.

Wikipedia, Radix Sort, [online], [Last edited on Apr. 16, 2020], retrieved from the Internet at <URL: https://en.wikipedia.org/w/index.php?title=Radix_sort&oldid=951249498>, 7 pp.

List of IBM Patents or Patent Applications Treated as Related, May 15, 2020, 2 pp. [18.920 (Appendix P)].

Patent Application with U.S. Appl. No. 16/875,719, dated May 15, 2020, 48 pp. [18.925 (Appln)].

International Search Report and Written Opinion for International Application No. PCT/IB2021/053781, dated Aug. 12, 2021, 10 pp. [18.920PCT (ISR & WO)].

Final Office Action dated Apr. 25, 2022, pp. 24, for U.S. Appl. No. 16/875,719.

AFCP Amendment dated Jun. 27, 2022, pp. 12, to Final Office Action dated Apr. 25, 2022, for U.S. Appl. No. 16/875,719.

RCE Amendment dated Jul. 21, 2022, pp. 14, to Final Office Action dated Apr. 25, 2022, for U.S. Appl. No. 16/875,719.

Office Action 1 for U.S. Appl. No. 16/875,719, dated Nov. 9, 2021, 31 pp. [18.925 (OA1)].

Response to Office Action 1 for U.S. Appl. No. 16/875,719, dated Feb. 9, 2022, 11 pp. [18.925 (ROA1)].

Office Action dated Aug. 29, 2022, pp. 23, for U.S. Appl. No. 16/875,719.

AFCP Amendment dated Jun. 27, 2022, pp. 12, to Final Office Action, for U.S. Appl. No. 16/875,719.

RCE Amendment dated Jul. 21, 2022, pp. 14, to Final Office Action dated Apr. 25, 2022, U.S. Appl. No. 16/875,719.

* cited by examiner

Initiator Write List 304a

FIG. 3A

| Write List Position WLP0 | Track Data | Track ID07 |
|---|---|---|
| Write List Position WLP1 | Track Data | Track ID12 |
| Write List Position WLP2 | Track Data | Track ID13 |
| Write List Position WLP3 | Track Data | Track ID15 |
| | | |

Target Write List 308a

FIG. 3B

| Target Write List Position TWLP32 | Track Data | Track ID07 |
|---|---|---|
| Target Write List Position TWLP33 | Track Data | Track ID12 |
| Target Write List Position TWLP34 | Track Data | Track ID13 |
| Target Write List Position TWLP35 | Track Data | Track ID15 |
| | | |

Target Write List 308a

| Target Write List Position TWLP32 | Track Data | Track ID07 |
|---|---|---|
| ↑ A1 | | |
| Target Write List Position TWLP33 | Track Data | Track ID12 |
| ↑ A2 | | |
| Target Write List Position TWLP34 | Track Data | Track ID13 |
| ↑ A3 | | |
| Target Write List Position TWLP35 | Track Data | Track ID15 |

FIG. 3C

Initiator Write List
304a

| Write List Position WLP0 | Track Data | Track ID07 |
|---|---|---|
| Write List Position WLP1 | Track Data | Track ID12 |
| Write List Position WLP2 | Track Data | Track ID13 |
| Write List Position WLP3 | Track Data | Track ID15 |
| | | |

⇐ A4

| Write List Position WLP2.1 | Track Data | Track ID14 |
|---|---|---|

FIG. 3D

Target Write List
308a

| Target Write List Position TWLP32 | Track Data | Track ID07 |
|---|---|---|
| Target Write List Position TWLP33 | Track Data | Track ID12 |
| Target Write List Position TWLP34 | Track Data | Track ID13 |
| ⇧ A5 | | |
| Target Write List Position TWLP35 | Track Data | Track ID14 |
| ⇧ A6 | | |
| Target Write List Position TWLP36 | Track Data | Track ID15 |

FIG. 3E

Initiator Write List 304a

| Write List Position WLP0 | Track Data | Track ID07 |
|---|---|---|
| Write List Position WLP1 | Track Data | Track ID12 |
| Write List Position WLP2 | Track Data | Track ID13 |
| Write List Position WLP3 | Track Data | Track ID15 |
| ⬆ A7 | | |
| Write List Position WLP4 | Track Data | Track ID14 |

FIG. 3F

Target Write List 308a

| Target Write List Position TWLP32.1 | Track Data | Track ID08 | ⇒ A9 |
| Target Write List Position TWLP34.1 | Track Data | Track ID14 | ⇒ A8 |

| Target Write List Position TWLP32 | Track Data | Track ID07 |
|---|---|---|
| Target Write List Position TWLP33 | Track Data | Track ID12 |
| Target Write List Position TWLP34 | Track Data | Track ID13 |
| Target Write List Position TWLP35 | Track Data | Track ID15 |

WRITE SORT MANAGEMENT IN A MULTIPLE STORAGE CONTROLLER DATA STORAGE SYSTEM

BACKGROUND

1. Field of the Invention

The present invention relates to a computer program product, computer system, and computer-implemented method for write sort management in a data storage system.

2. Description of the Related Art

A storage system may control access to storage for one or more host computational devices that may be coupled to the storage system over a network. A storage management application that executes in the storage system may manage a plurality of storage devices, such as disk drives, tape drives, flash drives, direct access storage devices (DASD), etc., that are coupled to the storage system. A job executing on a host may send Input/Output (I/O) commands or requests to the storage system which executes the I/O requests to read data from the storage devices or write data to the storage devices. The storage system typically includes a storage controller which controls the storage devices.

A storage controller of a storage system may include two or more servers, where each server may be referred to as a node, a storage server, a processor complex, a Central Processor Complex (CPC), or a Central Electronics Complex (CEC), for example. Each server may be included in a cluster. Each server may have a plurality of processor cores and the servers may share the workload of the storage system. In a two server configuration of the storage system referred to as a dual-server storage controller, either server can failover to the other if there is a failure or a planned downtime for one of the two servers.

A cache is a memory which typically provides faster access to data for input/output operations as compared to storage. Data to be read may be first staged into the cache from storage and then read directly from the cache instead of directly from the storage to provide faster access to read data. Conversely, data to be updated may be first updated in the cache and then destaged from a write list of write list entries to a target storage which is typically non-volatile storage, that is, the data persists in the non-volatile storage notwithstanding a loss of power to the storage. By comparison, some or all of the cache memory may be volatile memory, that is, data may not persist in a volatile cache in the event of a power failure.

Storage locations within storage for storing data are frequently physically located within the storage in sequential physical storage locations in which each physical storage location of the sequence is physically contiguous with a neighboring physical storage location. Such a sequence of physical storage locations may be assigned sequential physical addresses in an ordered sequence such as a monotonically increasing sequence of track identifications (track IDs). Each track ID of a monotonically increasing sequence increases only from one track to the next-in sequence track, and does not decrease. A chunk of data such as an extent of tracks having physically contiguous addresses is often referred to as a node in which the data of the node is ordered in a sequence corresponding to the monotonic sequence of physical addresses of the storage locations to which the node is to be stored.

A write list of write data to be destaged from cache to a target storage may often be more efficiently destaged to storage if the write list entries of the write list in cache are first sorted by target address so that the entries of write data of the write list are ordered in a sequence corresponding to the sequence of physical addresses of the target storage locations to which the data of the write list is to be stored. Write sorting of a write list ensures that the target storage location of each data write is located spatially after the immediately prior entry of the write list. Once the entries of a write list have been sequentially sorted by target address, additional entries of write data may be added to the sorted write list by searching the sorted write list for the appropriate insertion point which will maintain the sequential order of addresses once the new entry of write data is added. One known search technique is a linear or sequential search which compares the target address of the new data to be added, to the target address of each entry of the sorted write list in sequential address order, until the correction insertion point is found which maintains the sequence order of the write list.

Another known write list search techniques is a binary search which compares the target address of the new data to be added to an address of a middle entry of the sorted write list. Depending upon whether the correct insertion point for the new data entry is determined to be before or after the address of the middle entry, half of the sorted write list may be eliminated from the search based upon the comparison. The binary search process is repeated, halving the write list after each middle entry comparison until the correct insertion point is found. Such binary searches are often referred to as logarithmic time searches because in the worst case, the time needed to complete the logarithmic time search may be calculated as a log of the original number of entries in the sorted write list. For example, a worst case time to complete a logarithmic binary search may be calculated as log base 2 of the original number of entries in the sorted write list. Worst case time to determine an insertion point may be improved by employing techniques such as a b-tree. For example, worst case time to determine an insertion point may be improved to log base m where m is greater than 2. In one example, m is the child count of each node of the b-tree. Yet another known search is a radix sort, also known as a bucket sort or a digital sort. A radix sort is a non-comparative sorting algorithm which avoids comparison by creating and distributing elements into buckets according to their radix.

SUMMARY

Provided are a computer program product, system, and method for improving destaging of data from a cache to storage, In one embodiment, destaging data from a cache to storage includes preparing a write command to be issued to a target storage controller wherein the write command identifies a write data unit of a first write list of write data units to be written to storage locations of storage and the storage locations at which the write data unit of the first write list is to be stored. A determination is made in a sort/no-sort determination prior to issuing the write command to the target storage controller whether an insertion point for the write data unit of the write command in a target write list of write data units of the target storage controller is to be determined as a function of a first write list search.

With the above embodiment, the first write list search may be selectively either performed or bypassed at the target storage controller as a function of the sort/no-sort determination. As a result, unnecessary duplication of write sorts may be reduced or eliminated, providing a significant improvement in system performance.

In a further embodiment, the entries of the target write list are ordered as a function of storage location identified by each entry, in a monotonic sequence order of storage location identifications. The first write list search for a write list insertion point determination includes a search of the entries of the target write list to determine a write list insertion point which maintains the monotonic sequence order after an entry is inserted into the target write list.

With the above embodiment, a search of the entries of the target write list to determine a write list insertion point which maintains the monotonic sequence order after an entry is inserted into the target write, list, may be selectively either performed or bypassed at the target storage controller as a function of the sort/no-sort determination. As a result, unnecessary duplication of write sort operations for write list insertion point determinations for a monotonic sequence ordered write list may be reduced or eliminated.

In another embodiment, preparing the write command includes setting a sort/no-sort indicator to be transmitted to the target storage controller in association with the write command. The sort/no-sort indicator indicates to the target storage controller whether an insertion point for the write data unit of the write command in the target write list of write data units of the target storage controller is to be determined as a function of a write list search so that the write list search may be selectively one of performed and bypassed at the target storage controller as a function of the sort/no-sort indicator. In one example, the write command includes a write command data structure and the setting the sort/no-sort indicator includes setting a Boolean value within the write command data structure to indicate as a function of the Boolean value, whether an insertion point for the write data unit of the write command in the target write list of write data units of the target storage controller is to be determined as a function of a write list search.

With the above embodiments, a sort/no-sort indicator may be effectively and efficiently communicated to the target storage controller and in association with a write command, such as a setting of a write command data structure, for example, so that the write list search may be selectively either performed or bypassed at the target storage controller as a function of the sort/no-sort indicator.

In still another embodiment, the write command is in a sequence of write commands including a first write command and a second write command, in which the sequence of write commands is prepared for the first write list. The target storage controller receives the first write command from a first processing unit and places a write data unit of the first write command in a first entry of the target write list. The second write command is also received from the first processing unit and in response to receipt of the second write command and the associated sort/no-sort indicator of the second write command indicating that the write list search may be bypassed for the write data unit of the second write command, the write list search for the write data unit of the second write command is bypassed and instead, the write data unit of the second write command is inserted at a second entry of the target write list. In one embodiment, the second entry is positioned after the first entry.

With the above embodiments, the monotonic sequence order of the target write list is maintained after the second entry is inserted into the target write list notwithstanding that the write list search for the write data unit of the second write command is bypassed.

In yet another embodiment, prior to inserting the write data unit of the second write command at the second entry of the target write list, a confirmation is made as a function of a write list search of the target write list, as to whether inserting the second entry after the first entry maintains the monotonic sequence order of the target write list. In one embodiment, in response to confirming that inserting the second entry after the first entry does not maintain the monotonic sequence order of the target write list, another confirmation is made as a function of a write list search of the target write list within a predetermined range of entries, whether inserting the second entry at an insertion point within the predetermined range of entries of the target write list maintains the monotonic sequence order of the target write list. In one embodiment, in response to confirming that inserting the second entry at an insertion point within the predetermined range of entries of the target write list does not maintain the monotonic sequence order of the target write list, a logarithmic time search of the entries of the target write list including entries outside the predetermined range of entries of the target write list, is made to determine a write list insertion point for the second entry which maintains the monotonic sequence order after the second entry is inserted into the target write list.

With the above embodiments, a sort/no-sort indicator of the second write command indicating that the write list search may be bypassed, may be treated by the target storage controller as a hint, providing flexibility in the use of the sort/no-sort indicator.

In one embodiment, destaging data from a cache to storage includes determining available processing capacities of each of a plurality of storage controllers. Assigned to a storage controller of the plurality of storage controllers, as a function of available processing capacities of each of the plurality of storage controllers, is a write sort task of write sorting a write list of data units to be destaged to storage.

With the above embodiment, a write list need not be write sorted by a storage controller using that write list but instead, a task of write sorting the write list may be assigned to another storage controller having greater availability of processing capacity. As a result, system performance may be improved.

In another embodiment, determining available processing capacities of each of the plurality of storage controllers includes polling each of the plurality of storage controllers to request the available processing capacities of each of the polled plurality of storage controllers.

With the above embodiment, an appropriate storage controller to which the write sort task is to be assigned, may be effectively and efficiently selected.

In another embodiment, write sort task assigning to a storage controller of the plurality of storage controllers includes load balancing loads of the plurality of storage controllers.

With the above embodiment, a write sort related task may be assigned to the selected storage controller to improve load balancing amongst the storage controllers of the system.

In yet another embodiment, the write list to be write sorted by the write sort task is an initiator write list for generating a sequence of write commands to be issued to a target storage controller for destaging data units of the initiator write list to storage controlled by the target storage controller. In one embodiment, the write sort task includes write sorting entries of the initiator write list as a function of a storage location identified by each entry, in a monotonic sequence order of storage location identifications of the initiator write list entries. In one embodiment, the assigned write sort task includes at least one of a logarithmic time search and a sequential search of the initiator write list to determine an initiator write list insertion point which maintains a monotonic sequence order after an entry is inserted into the target write list.

With the above embodiments, an initiator write list need not be write sorted by the initiator storage controller using that initiator write list but instead, a task of write sorting the initiator write list in a monotonic sequence order of storage location identifications, for example, using either a logarithmic time search or a sequential search, for example, may be assigned to another storage controller having greater availability of processing capacity. As a result, system performance may be improved.

In yet another embodiment, the write sort task includes setting a sort/no-sort indicator to be transmitted to a target storage controller in association with a write command of the sequence of commands, to indicate to the target storage controller that a determination of an insertion point for a write data unit of a write command in a target write list of write data units of the target storage controller may be bypassed at the target storage controller as a function of the sort/no-sort indicator.

With the above embodiments, a task of setting a sort/no-sort indicator for entries of an initiator write list need not be performed by the initiator storage controller using that initiator write list but instead, a task of sort/no-sort indicator setting for the initiator write list may be assigned to another storage controller having greater availability of processing capacity. As a result, system performance may be improved.

In still another embodiment, the write list to be write sorted by the write sort task is a target write list for generating a sequence of destaging operations for destaging data units of the target write list to storage controlled by the target storage controller. In one embodiment, the assigned write sort task includes at least one of a logarithmic time search and a limited time search of the target write list to determine a target write list insertion point which maintains a monotonic sequence order after an entry is inserted into the target write list.

With the above embodiments, a target write list need not be write sorted by the target storage controller using target write list but instead, a task of write sorting the target write list in a monotonic sequence order of storage location identifications, for example, using either a logarithmic time search or a limited time search, for example, may be assigned to another storage controller having greater availability of processing capacity. As a result, system performance may be improved.

BRIEF DESCRIPTION OF THE SEVERAL VIEWS OF THE DRAWINGS

In the drawings, like reference numbers represent corresponding parts throughout.

FIGS. 3a-3g illustrate various examples of assembling write lists of data to be destaged to storage by a computer system employing write sort management in accordance with certain embodiments.

FIG. 4 illustrates, in a flowchart, an example of initiator operations for write sort management in accordance with certain embodiments.

DETAILED DESCRIPTION

Figure 1:
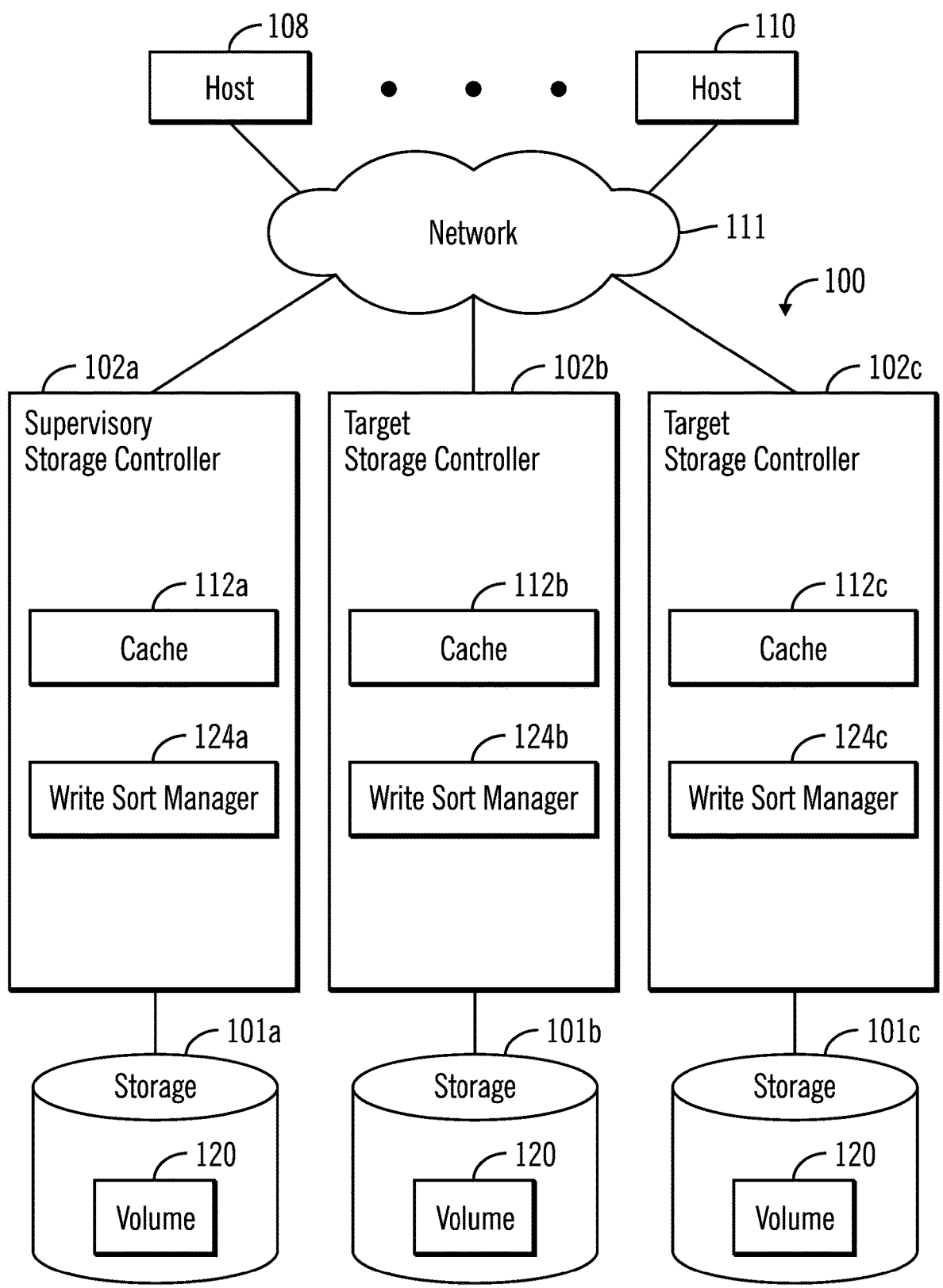
FIG. 1 illustrates, in a block diagram, a computing environment employing write sort management in accordance with certain embodiments.

The descriptions of the various embodiments of write sort management in accordance with the present disclosure, have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is appreciated herein that sorting a write list prior to writing the write list to storage is often a computational intensive operation which can consume significant time and processing resources such that it can have a significant adverse impact on overall system performance. In accordance with one aspect of write sort management in accordance with the present description, it is appreciated that write sorting may be unnecessarily duplicated in prior data storage systems, particularly in data storage systems having multiple storage controllers capable of performing write sorting. For example, if one storage controller has a supervisory role supervising other target storage controllers, the supervisory storage controller may be configured to issue a series of write commands to one or more target storage controllers to write a series of data writes of a write list to storage. Absent write sort management in accordance with the present description, each target storage controller receiving the write list may perform its own write sorts of the data by storage address prior to destaging the data to the storage controlled by the individual target storage controller. Thus, each time a target storage controller receives a data write for the write list to be stored, the target storage controller may perform a search of the write list in its cache to determine the appropriate insertion for the new data write. As a result, the target storage controllers duplicate the write sort operations performed by the other target storage controllers, causing an unnecessary adverse impact on system performance.

Moreover, the supervisory storage controller may itself perform write sorts to sort by storage address the data writes of the write list. As a result, the target storage controllers duplicate the write sort operations performed not only by the other target storage controllers but also by the supervisory storage controller, further causing an unnecessary adverse impact on system performance.

In one aspect of write sort management in accordance with the present description, one storage controller performing a write sort of a write list of write data to be stored by other storage controllers, communicates to the other storage controllers that write sorting of the write list may be bypassed by those other storage controllers, reducing or eliminating unnecessary duplication of write sorting operations. For example, in one embodiment of a data storage system employing write sort management in accordance with the present description, a supervisory storage controller write sorts an initiator write list prior to issuing a series of write commands to the target storage controllers to write the data of the write list to storage. The supervisory storage controller communicates to the target storage controllers that each target storage controller may bypass performing its own write sort operations in assembling a target write list. Instead, each time a target storage controller receives a data write command for the target write list, the target storage controller adds an entry for the latest data write to the target write list being formed in the cache of the target storage controller, immediately after the prior entry of write data of the target write list. As a result, each target storage controller bypasses performing searches of the target write list in its cache to determine the correct insertion point for each received data write. Instead, each target storage controller places the latest received data write in an entry after the entry for the previously received data write, which is typically, at the end of the target write list being formed in the cache of the target storage controller. In this manner, the target write list in the target storage controller may be fully write sorted for efficient destaging without the target storage controller performing much if any of the write sorting itself.

In another aspect of write sort management in accordance with the present description, it is appreciated that one or more of the tasks described herein and related to write sorting of write lists of data units to be destaged to storage, may be distributed to one or more other storage controllers to achieve a more balanced load sharing amongst the various storage controllers of the system. For example, an initiator write list need not be write sorted by a supervisory storage controller but instead, a task of write sorting the write list to provide a monotonic sequence ordering for example, of the write list, may be assigned to another storage controller having greater availability of processing capacity. In one embodiment, a suitable storage controller to be assigned the write sort related task may be determined by polling each storage controller to determine a storage controller having greater available processing capacity than other storage controllers. Accordingly, the write sort related task may be assigned to the selected storage controller to improve load balancing amongst the storage controllers of the system. Moreover, an appropriate storage controller to which the write sort task is to be assigned, may be effectively and efficiently selected.

A system of one or more computers may be configured for write sort management in accordance with the present description, by virtue of having software, firmware, hardware, or a combination of them installed on the system that in operation causes or cause the system to perform with write sort management in accordance with the present description. For example, one or more computer programs in computer-readable memories may be configured to perform with write sort management by virtue of including instructions that, when executed by data processing apparatus such as for example a storage controller processor, cause the apparatus to perform the actions.

The operations described herein are performed by logic which is configured to perform the operations either automatically or substantially automatically with little or no system operator intervention, except where indicated as being performed manually Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable program code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

FIG. 1 illustrates a block diagram of a computing environment comprising a storage system 100 which includes storage 101a, 101b, 101c controlled by storage managers of storage controllers 102a, 102b, 102c, respectively, which are configured to control their associated storage. In this embodiment, the storage controller 102a may include supervisory functions of an IBM Storage Area Network (SAN) Volume Controller (SVC), for example, which has been modified to employ write sort management in accordance with the present description. The storage controllers 102b and 102c of this embodiment may include primary and secondary target storage controller functions of an IBM Enterprise Storage Server (ESS), for example which have also been modified to employ write sort management in accordance with the present description. In one embodiment, the storage controller 102a may also include target storage controller functions such as those of an IBM Enterprise Storage Server (ESS), for example.

In general an SVC controller is an inline virtualization or "gateway" device logically positioned between hosts such as the hosts 108, 110 and storage arrays such as the target storage controllers 102b, 102c and their associated storage. The storage controller 102a as an SVC controller presents itself to hosts such as hosts 108, 110 as a storage provider (target storage controller) and presents itself to the target storage controllers 102b, 102c as a large host (input/output (I/O) initiator). The SVC functions are typically implemented in a virtualization layer to simplify compatibility requirements amongst heterogenous servers and storage devices.

The IBM ESS functions provide a high-capacity device that can back up data to a variety of different storage devices 101a, 101b, 101c. For example, a large corporation or other enterprise may have a network of servers that each store data for a number of workstations used by individual employees. Periodically, the data on the host servers is backed up to storage such as the storage 101b by its high-capacity storage controller 102b acting as a primary storage provider, to avoid data loss if the host servers malfunction. The storage controller 102b itself typically has redundant storage resources within the associated storage 101b to provide an additional safeguard against data loss. As a further measure, the data of the storage controller 102b may be mirrored to a secondary storage server, represented by storage controller 102c having associated storage 101c, which are typically located at a remote site. A storage server of a particular type, such as one that uses disk storage, may connect to one or more other peer disk storage servers as well as to other storage devices, such as those using magnetic tape. Communication between the devices may be achieved using any desired communication protocol and medium. A user interface may be provided to allow a user to access information regarding the status of the storage controllers 102a, 102b, 102c. In one embodiment, the storage 101a represents a backend storage which is effectively another storage controller such as the storage controller 102b or 102c, for example.

In this example, one or more of the storage controllers 102a, 102b, 102c communicate with a plurality of hosts 108 . . . 110 over a network 111, in accordance with certain embodiments. A job executing on a host 108, 110 may send Input/Output (I/O) commands or requests to the SVC controller of the storage controller 102a. The storage manager of the SVC storage controller 102a generates suitable I/O commands to a storage provider such as the primary storage controller 102b and in response, the storage manager of the primary storage controller 102b executes the I/O commands to read data from the storage 101b or write data to the storage 101b. In this embodiment, the storage 101a, 101b, 101c store data in a suitable format such as volumes 120, for example.

In this embodiment, each storage controller 102a, 102b, 102c has a memory which includes a cache 112a, 112b, 112c, respectively which are controlled by the storage managers of the storage controllers 102a, 102b, 102c. For example, data is staged to and destaged from cache 112a, 112b, 112c in read and write operations directed by storage managers to the storage 101a, 101b, 101c.

As explained in greater detail below, the storage manager of each storage controller 102a, 102b, 102c further includes a write sort manager 124a, 124b, 124c, respectively, employing write sort management in accordance with one embodiment of the present description. The storage managers including the write sort managers 124a, 124b, 124c execute software, firmware and/or micro code, e.g., computer code devices, stored in an associated memory to achieve the functionality described herein. Such memories may be considered to be program storage devices. The memories may be provided, e.g., in a region of a cache that is preserved during a reboot, or in a separate non-volatile memory.

The storage controllers 102a, 102b, 102c and the hosts 108, 110 may comprise any suitable computational device including those presently known in the art, such as, a personal computer, a workstation, a server, a mainframe, a handheld computer, a palm top computer, a telephony device, a network appliance, a blade computer, a processing device, a controller, etc. The storage controllers 102a, 102b, 102c may provide redundancy because if one controller or its storage undergoes a failure from which recovery is not possible, an alternate storage provider may perform the functions of the storage provider that failed. Each of the storage controllers 102a, 102b, 102c may include a processing complex of a cluster and may include one or more processors and/or processor cores.

The storage controllers 102a, 102b, 102c, the hosts 108, 110 and the storage 101a, 101b, 101c, may be elements in any suitable network 111, such as, a storage area network, a wide area network, the Internet, an intranet, busses, etc. In certain embodiments, storage controllers 102a, 102b, 102c, the hosts 108, 110 and the storage 101a, 101b, 101c, may be elements in a cloud computing environment.

The cache 112a, 112b, 112c may in certain embodiments, comprise a write cache partitioned into one or more ranks, where each rank may include one or more storage tracks. The cache 112a, 112b, 112c may be any suitable cache known in the art or developed in the future. In some embodiments, the cache 112a, 112b, 112c may be implemented with a volatile memory and/or non-volatile memory such as a multi-tier cache having a relatively fast cache tier implemented with DRAM type memory, for example, and a relatively slow cache tier implemented with NAND type flash memory, for example. The cache 112a, 112b, 112c may store both modified and unmodified data, and may periodically destage (i.e., move) data from the cache 112a, 112b, 112c to one or more of the storage 101a, 101b, 101c controlled by the storage controllers 102a, 102b, 102c, respectively.

It should be noted that each storage controller 102a, 102b, 102c may be configured and accessed in many different ways. For example, virtualization may be performed to access the hardware elements of a storage controller 102a, 102b, 102c. Additionally, in certain embodiments, each storage controller 102a, 102b, 102c may have a single server or more than two servers.

Figure 2:
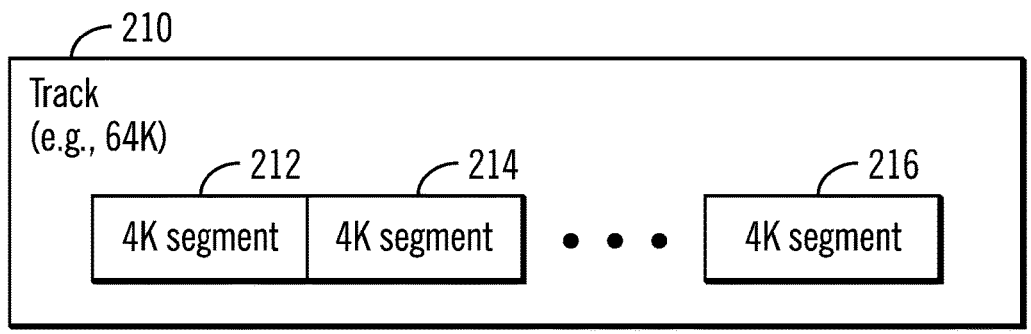
FIG. 2 depicts an example of a track of data.

In certain embodiments, each track (an exemplary track 210 is shown) may include multiple segments of 4 Kbytes in size. Thus, in this example, a track is divided into segments of sectors, which may comprise a unit of storage of the storage 101a, 101b, 101c. The exemplary track 210 of FIG. 2 has up to 17 segments as represented by the segments 212, 214 . . . 216. A track 210 may be temporarily stored in a cache such as the cache 112a of the caches 112a, 112b, 112c before being destaged to storage. A track residing in cache may have a full set of segments or may have a subset of segments in the cache 112a, 112b, 112c.

In one embodiment, device adapters (DA) are used to connect the disks of a disk array of the storage 101a, 101b, 101c to the caches 112a, 112b, 112c of the storage controllers 102a, 102b, 102c (FIG. 1). Host adapters (HA's) connect storage controllers 102a, 102b, 102c to hosts 108, 110 over a communication fabric of the network 111 (FIG. 1). It is appreciated that other devices may be used to couple storage controllers to hosts and storage devices.

A host may have data stored into one or more of the storage 101a, 101b, 101c (FIG. 1) via the storage controllers 102a, 102b, 102c, respectively, by issuing a write request to the supervisory storage controller 102a in this embodiment. The write request may include a track identification (ID) which identifies the target track location in storage at which the data is to be stored. In response, the supervisory storage controller 102a adds the write data and the target storage address or location (e.g. track ID) of each write request to an entry of a write initiator write list 304a (FIG. 3) maintained in the cache 112a of the supervisory storage controller 102a. In this manner, write data received from a host 108, 110 may be assembled in the cache 112a by the write sort manager 124a of the supervisory storage controller 102a into a write list 304a (FIG. 3) of data units such as data tracks for example, to be written into a storage selected by the host. In one embodiment, the write data of each entry of the write list may be data for a single track, an extent of physically contiguous tracks, or a node or chunk of physically contiguous tracks. Similarly, the track ID for each entry may be a single track ID or may be a range of consecutively numbered track IDs for an extent of physically contiguous tracks, or a node or chunk of physically contiguous tracks. It is appreciated that the data units of write data and the associated target storage location identifications of each entry may be directed to other types of data units such as pages, for example, depending upon the particular application. In the illustrated embodiment, a relatively few number of write list entries is depicted in the figures for purposes of simplicity. It is appreciated that in various applications such as large enterprise applications, the write list entries may number in the hundreds, thousands or more.

Track storage locations within storage such as disk hard drive storage are physically located within the storage in sequential physical storage locations in which each physical storage location or track of the sequence is physically contiguous with a neighboring physical storage location or track. Such a sequence of tracks or physical storage locations may be assigned sequential physical addresses such as track IDs in an ordered sequence such as a monotonically increasing sequence of physical addresses, for example which increase from sequential address to the next-in-sequence sequential address. It is appreciated that assigned sequential physical addresses may be in an ordered sequence which decreases monotonically from sequential address to the next-in-sequence sequential address.

A write list of tracks of data to be destaged from cache to a target hard disk storage may be more efficiently destaged to storage if the entries of the write list in cache are first sorted by track ID so that the tracks of write data of the write list are also ordered in a sequence corresponding to the sequence of tracks IDs of the storage locations to which the write list is to be stored. Once a write list has been sequentially sorted by target addresses, that is, target track IDs in this example, additional entries of tracks of write data may be added to the sorted write list by searching the sorted write list for the appropriate insertion point which will maintain the sequential order of addresses once a new entry of track write data is added.

One known search technique is a linear or sequential search which compares the target track ID of track write data to be inserted as a new entry into a write list of entries, to the track ID of each entry of the write list which has been sorted in sequential track ID order, until the appropriate insertion point is found which will maintain the ordered sequence of entries. Another known write list search technique is a binary search which compares the track ID of a track to be inserted as a new entry into a sorted write list of entries, to the target track ID of a middle entry of the sorted write list, eliminating one half of the write list from the search based upon that comparison, and repeating the search process until the appropriate insertion point is located which will maintain and not disrupt the ordered sequence of the write list entries. It is appreciated that a single track may be inserted as an entry into the sorted write list at a time, or an extent of contiguous tracks may be inserted as an entry into the sorted write list at a time.

In the example of FIG. 3a, the entries of the initiator write list 304a has been write sorted by the write sort management 124a (FIG. 1) of the storage manager of the supervisory storage controllers 102a, to be ordered sequentially by target track ID, beginning at the lowest target track ID value (track ID07 in this example) placed in a first write list entry position WLP0, and increasing monotonically by target track ID to the last write list entry position (WLP3 in the example of FIG. 3a) at which the track data having the highest target track ID value (track ID15 in the example of FIG. 3a) is placed. Gaps in the target storage locations are permitted such as those indicated between track ID07 and track ID12 of the write list 304a as long as the target storage location of each entry is located spatially after the target storage location of the prior entry of the write list. Such write sorting may be made more efficient if the host transfers tracks of a sequence of write I/O requests already ordered by target track ID. Thus, write data arriving from a host may be inspected to confirm whether the new write data is ordered by track ID relative to previously received track write data and if so, simply add each new entry after the last entry previously added to the write list entry 304a which is usually positioned at the end of the write list 304a. Such a limited write sort process is referred to herein as a write list insertion point confirmation process.

However, if track write data arrives from the host out of track ID order, the write sort management 124a of the supervisory storage controller 102a can perform a more time consuming write sort of the tracks by target track ID to maintain the monotonic sequential ordering of the entries of the initiator write list 304a. Suitable write list search techniques include sequential, binary, logarithmic time, limited time, radix and/or linear search techniques, for example. Other write list search techniques may be employed, depending upon the particular application. As explained in greater detail below, in this example, the initiator write list 304a may be processed by the initiator storage controller 102a which is configured to issue a series or sequence of write commands to a target storage controller such as the primary storage controller 102b. In response to the sequence of write commands from the initiator storage controller 102a, the target storage controller 102b assembles a corresponding write sorted target write list 308a (FIG. 3b) of write data to be destaged (that is, written) to the storage 101b controlled by the primary storage controller 102b.

FIG. 4 depicts an example of operations 404-420 of the storage manager of the supervisory storage controller 102a for processing a write list such as the write list 304a. In this example, the storage manager of the supervisory storage controller 102a including the write sort manager 124a have been configured for write sort management operations in accordance with one embodiment of the present description. Although the logic performing the operations of FIG. 4 are described in connection with the storage manager and its associated write sort manager 124a of the supervisory storage controller 102a, it is appreciated that such write sort management operations may be located in other devices, such as a host, or another storage controller such as a primary, secondary or tertiary storage controller, for example, depending upon the particular application.

Figure 5:
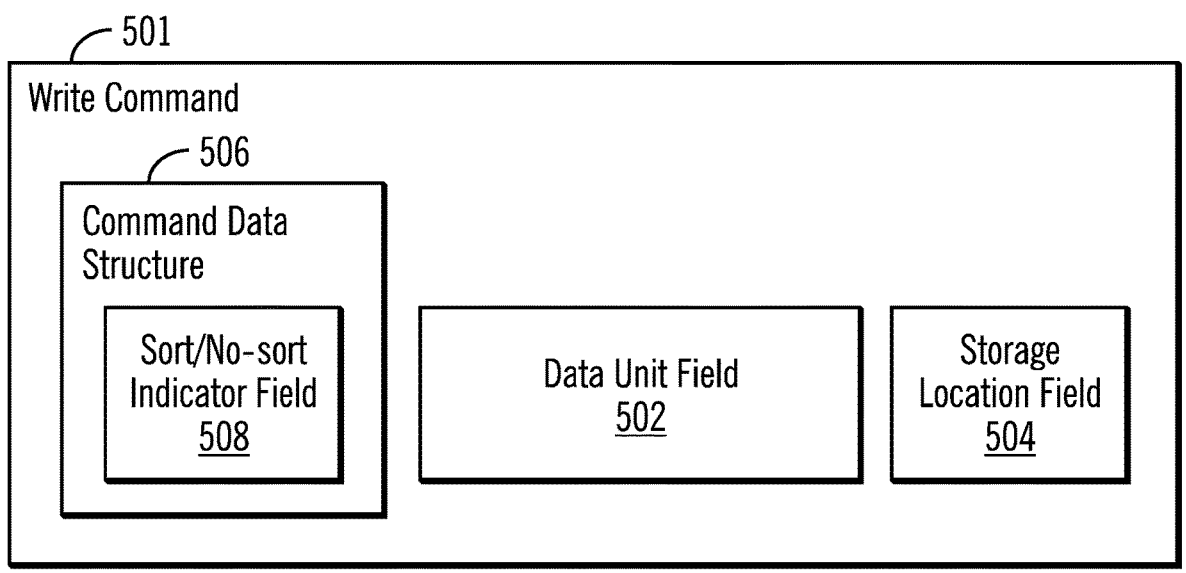
FIG. 5 depicts an example of a write command employing write sort management in accordance with certain embodiments.

Having assembled a write list such as the write list 304*a* (FIG. 3*a*), the write sort management 124*a* of the supervisory storage controller 102*a*, initiates (block 404, FIG. 4) preparation of a write command of a sequence of write commands based upon the write list 304*a*, to be issued to a target storage controller which in this example is the primary storage controller 102*b*. As explained in greater detail below, the sequence of write commands when prepared and issued, commands the target storage controller to write the write data of each entry of the write list 304*a* to its associated storage 101*b*. Accordingly, in this embodiment, FIG. 5 shows one example of a suitable format for a write command 501 to be prepared and issued for an entry of the write list 304*a*. In this embodiment, the write command 501 includes a data unit field 502 (FIG. 5) which contains or identifies a data unit such as track write data of an entry of the write list 304*a*, and also a target storage location field 504 (FIG. 5) which contains or identifies the target track ID of the entry of the write list 304*a*. As previously mentioned, the target track ID identifies the storage location at which the data unit of the write command is to be stored at the storage of the target storage controller.

In this example, an initial write command has already been issued to the target storage controller 102*b* for the first write list entry at write list entry position WLP0 (FIG. 3*a*) of the initiator write list 304*a*, resulting in the first target write list entry at target write list entry position TWLP32 (FIG. 3*b*) of the target write list 308*a*. Accordingly, the next-in-sequence write command to be prepared of the sequence of write commands, identifies the track write data of the next-in-sequence write list entry at write list position WLP1 (FIG. 3*a*) of the write list 304*a*, and the target storage location (track ID12 in this example) of storage 101*b* controlled by the primary storage controller 102*b*, at which the data unit is to be stored.

Prior to issuing the write command for the write list entry WLP1 to the target storage controller 102*b*, the write sort manager 124*a* of the supervisory storage controller 102*a* conducts a sort/no-sort determination which determines (block 408, FIG. 4) whether a write sort should be performed by the target storage controller in assembling its own target write list 308*a* (FIG. 3*b*) in response to the write command from the initiator storage controller 102*a*. For example, the write sort if performed by the target storage controller, may include a logarithmic binary search to determine the appropriate insertion point within the target write list 308*a* to maintain the monotonic sequence order of the write list 308*a* once an entry for the data unit of write data of a received write command has been added to the write list 308*a*. Other write list search techniques may be employed, depending upon the particular application. Thus, in one embodiment, the sort/no-sort determination (block 408, FIG. 4) determines whether an insertion point for the entry for the write data unit of the write command in a target write list of write data units of the target storage controller, is to be determined as a function of a logarithmic time write list search so that the logarithmic time write list search may be selectively either performed or bypassed at the target storage controller as a function of the sort/no-sort determination.

In the embodiment of FIG. 3*a*, the initiator write list 304*a* has already been write sorted to a monotonic sequence ordered write list. In one aspect of write sort management in accordance with the present description, it is appreciated that because the initiator write list 304*a* has already been write sorted, the target storage controller need not again perform a write sort to write sort its own target write list 308*a* (FIG. 3*b*) prior to destaging the write data of the target write list 308*a* to the storage 101*b* controlled by the target storage controller 102*b*. Thus, as explained below in connection with FIG. 6, the target storage controller can bypass performing its own write sort and instead place each entry for received data units of write data after the last previously entered entry of the target write list 308*a* as each data unit of write data and its target storage location, is received in sequence from the supervisory target controller 102*a* for the write list 308*a*. In one embodiment, if the storage controller performs its own write sort rather than bypassing the write sort, the write sort may include a logarithmic time search of the entries of the target write list to determine a write list insertion point which maintains the monotonic sequence order after an entry is inserted into the target write list.

If it is determined (block 408, FIG. 4) that a write sort need not be performed by the target storage controller in assembling its own target write list 308*a* (FIG. 3*b*) in response to the write command from the initiator storage controller 102*a*, the write sort manager 124*a* sets (block 412, FIG. 4) a sort/no-sort indicator to be transmitted to the target storage controller in association with the write command, to indicate to the target storage controller that a write sort need not be performed for the data unit of the write command In this manner, the sort/no-sort indicator is effectively and efficiently transmitted to the target storage controller. In one embodiment, the sort/no-sort indicator indicates to the target storage controller whether an insertion point for the entry for the write data unit of the write command to be added to the target write list of write data units of the target storage controller, is to be determined as a function of a logarithmic time write list search so that the logarithmic time write list search may be selectively either performed or bypassed at the target storage controller as a function of the sort/no-sort indicator.

In this example, the write sort manager 124*a* of the supervisory write controller 102*a* determines (block 408, FIG. 4) for the write command being prepared for the track write data of the write list entry at write list position WLP1 of the initiator write list 304*a*, that write sorting for the entry for the track write data of the write list entry at position WLP1, may be bypassed by the target storage controller because the initiator write list 304*a* has already been write sorted. Accordingly, the write sort manager 124*a* sets (block 412, FIG. 4) a sort/no-sort indicator to be transmitted to the target storage controller in association with the write command, to indicate to the target storage controller that a write sort need not be performed to determine an insertion point within target write list 308*a* (FIG. 3*b*) for the entry to be added to the target write list 308*a*, for the data unit of write list position WLP1 of the initiator write list 304*a*. Instead, as explained in connection with FIG. 6, the write sort may be bypassed and the entry placed after the prior entry of the target write list 308*a* by the target storage controller. In this example, the write sort manger 124*a* sets (block 412, FIG. 4) the sort/no-sort indicator to indicate that a logarithmic time search based write list insertion point determination by the target storage controller is to be bypassed because the initiator write list 304*a* has already been write sorted.

FIG. 5 shows an example of a data structure 506 for a write command of the sequence of write commands for the initiator write list 304*a*. In this example, the write command data structure 506 is a write command descriptor block in which a sort/no-sort indicator for the write command is provided by a sort/no-sort indicator field 508. In this manner, the sort/no-sort indicator is effectively and efficiently transmitted to the target storage controller. In one embodiment, the write sort manager 124a sets (block 412, FIG. 4) a Boolean value in the sort/no-sort indicator field 508 to indicate as a function of the Boolean value, whether an insertion point for the entry for the write data unit of the write command to be added to the target write list of write data units of the target storage controller, is to be determined as a function of a logarithmic time write list search so that the logarithmic time write list search may be selectively either performed or bypassed at the target storage controller as a function of the sort/no-sort indicator.

In this example, the write sort manger 124a sets (block 412, FIG. 4) the sort/no-sort indicator field 508 to indicate that the write list insertion point determination by the target storage controller is to be bypassed for the track write data of write list position WLP1 because the initiator write list 304a has already been write sorted. As a result, as explained in connection with FIG. 6, the write sort at the target storage controller may be bypassed and the entry placed after the prior entry of the target write list 308a by the target storage controller. It is appreciated that the data structure for a write command may vary, depending upon the storage protocol of the storage controller to which the write command is directed. Examples of suitable storage protocols include SCSI (Small Computer Storage Interface), NVMe (Non-volatile Memory Express), and CKD (Count Key Data). Other storage protocols may be utilized, depending upon the particular application.

At an appropriate point following completion of the write command, the completed write command is issued (block 416, FIG. 4) to the target storage controller which is the primary storage controller 102a in this example. The operations of FIG. 4 are repeated for each of the remaining write list positions WLP2-WLP3 of the write list 304a in sequence to prepare and issue a sequence of write commands for the write track data of each write list position of the monotonic sequence ordered write list 304a of FIG. 3a.

Figure 6:
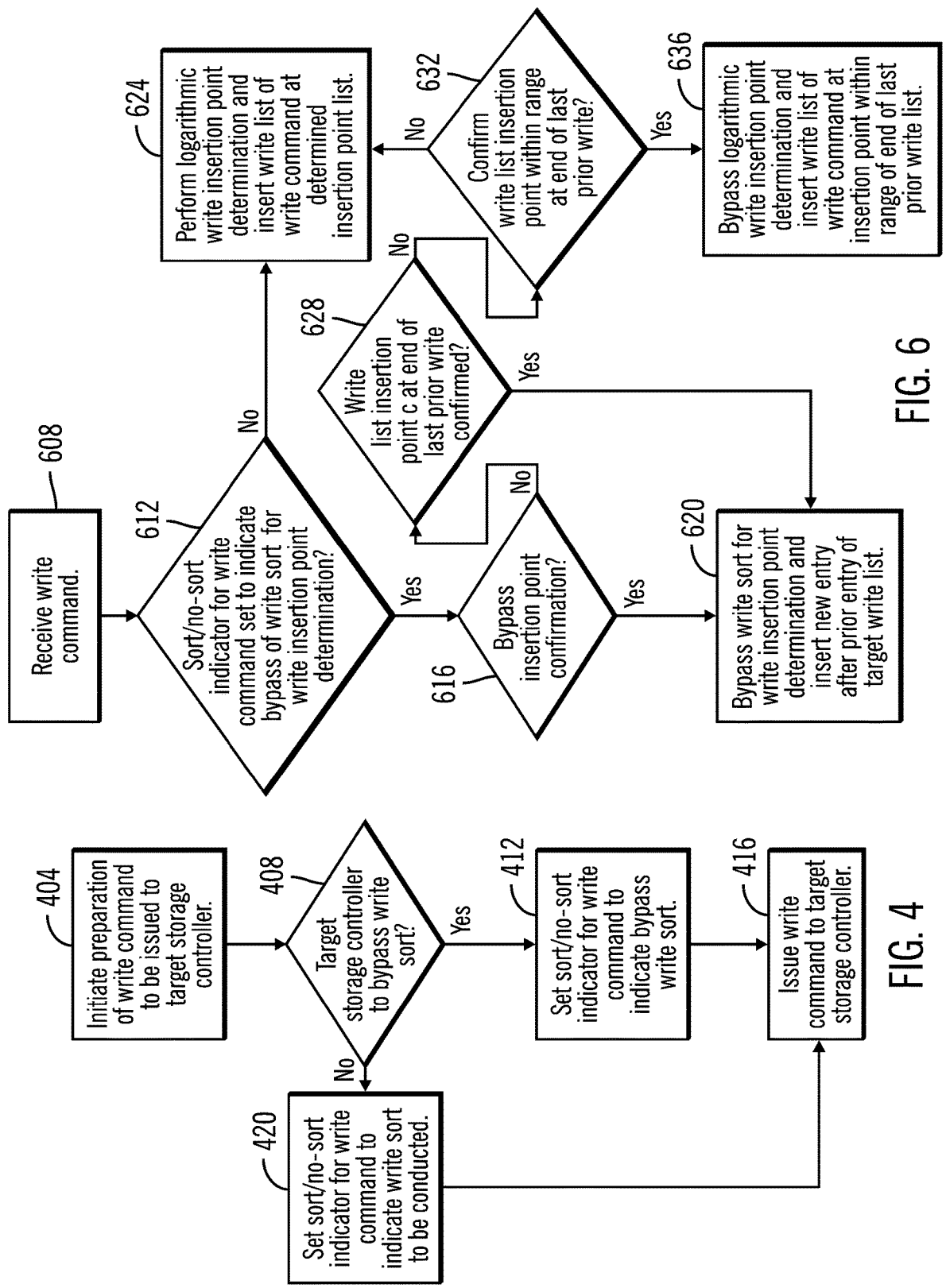
FIG. 6 illustrates, in a flowchart, an example of target operations for write sort management in accordance with certain embodiments.

FIG. 6 depicts an example of operations 608-636 of the storage manager of the target storage controller 102b for processing received write commands to assemble a write list such as the target write list 308a (FIG. 3b). In this example, the storage manager of the target storage controller 102b including the write sort manager 124b have been configured for write sort management operations in accordance with one embodiment of the present description. Although the logic performing the operations of FIG. 6 are described in connection with the storage manager and its associated write sort manager 124b of the target storage controller 102b, it is appreciated that such write sort management operations may be located in other devices, such as a host, or another storage controller such as a supervisory, secondary or tertiary storage controller, for example, depending upon the particular application.

In one embodiment, upon receipt (block 608, FIG. 6) of a write command from an initiator such as the supervisory storage controller 102a, the write sort management 124b of the target storage controller 102b inspects the sort/no-sort indicator field 508 (FIG. 5) of the write command block data structure of the currently received write command to determine (block 612, FIG. 6) if the sort/no-sort indicator has been set for the currently received write command In one embodiment, as noted above, the sort/no-sort indicator indicates whether an insertion point for the write data unit of the received write command in the target write list of write data units of the target storage controller is to be determined as a function of a logarithmic time write list search so that the logarithmic time write list search may be selectively either performed or bypassed at the target storage controller as a function of the sort/no-sort indicator.

In this example, a write command for the track write data of the write list entry at position WLP0 of the write list 304a has already been received and processed by the write list manager 124b, resulting in the write list entry at target write list entry position TWLP32 of FIG. 3c which depicts the sequential assembling of the target write list 308a which is shown completed in FIG. 3b. In this example, the currently received write command is for the track write data of the next-in-sequence write list entry position WLP1 of the write list 304a of the supervisory storage controller 102a. As set forth above, in this example, the write sort manger 124a has set (block 412, FIG. 4) the sort/no-sort indicator field 508 for the currently received command, to indicate that a logarithmic time search for a write list insertion point determination by the target storage controller is to be bypassed for the track write data entry of the currently received command prepared for write list entry position WLP1 of the initiator write list 304a, because the initiator write list 304a has already been write sorted.

In one embodiment, the write sort manager 124b of the target storage controller 102b may be operated in a mode in which a write list insertion point confirmation process is also bypassed (block 616, FIG. 6) for the currently received write command. Accordingly, if not only a logarithmic time search for a write list insertion point determination is bypassed (block 612, FIG. 6) but also a write list insertion point confirmation process is bypassed (block 616, FIG. 6) as well, the write sort manager 124b of the target storage controller 102b proceeds to add (block 620, FIG. 6) an entry for the track write data of the currently received command, to the target write list 308a in an entry at the target write list position TWLP33 as indicated by arrow A1. Thus, an entry for the currently received command is added at target write list entry position TWLP33 which is after the last previously entered entry of the target write list which is target write list position TWLP32 in this example. At this point in the assembly of the target write list 308a, the entry at the target write list position TWLP33 is added at the end of the target write list 308a being assembled in the cache 112b of the target storage controller 102b as shown in FIG. 3c at arrow A1.

As set forth above, in this example, the last prior write command to the target storage controller 102b resulted in a write list entry being added at target write list entry position TWLP32 which contains the write data of the initiator write list entry at write list position WLP0 of the initiator write list 304a (FIG. 3a) used to generate the previous write command. The track ID of the write list entry TWLP32 is the track ID07. The write command currently received by the target storage controller in this example resulted in another write list entry being added to the next-in-sequence target write list entry position which is TWLP33 in this example. As shown in FIG. 3c, the track ID of the write list entry at TWLP33 is track ID12 which has a greater value than track ID07 of the prior target write list entry TWLP32. In this manner, the sequential entries TWLP32 and TWLP33 are monotonic sequence ordered notwithstanding bypassing of a logarithmic time write list search for a write list insertion point determination.

The operations of FIG. 6 are repeated for each received write command of the sequence of write commands generated from the initiator write list 304a (FIG. 3a) to assemble the target write list 308a depicted in FIG. 3b, 3c having entries at target write list positions TWLP32-TWLP35 corresponding to initiator write list entries at initiator write list position WLP0-WLP3 of the initiator write list 304a (FIG. 3a). The remaining entries of the target write list 308a may be added after the last previously added entry to the target write list 308a in monotonic sequence order as indicated by the addition arrows, first arrow A2 and then arrow A3, without performing a logarithmic time write list search to determine an insertion point for each entry. Instead, the write sort management 124b of the target storage controller 102b detects that the sort/no-sort indicator for each write command of the sequence has been set and inserts the entry after the previous entry, bypassing a write sort for the entry insertion point. As previously mentioned, the write sort management 124a of the supervisory storage controller 102a sets the sort/no-sort indicator for each write command of the sequence to cause the target write controller to bypass a logarithmic time write list search to determine the insertion point which maintains the monotonic sequence order for each entry of the target write 308a because the initiator write list 304a used to generate the sequence of write commands, had already been write sorted.

The operations of FIG. 4 may be further repeated for an expansion of the write list 304a of FIG. 3a in response to additional I/O write requests from the host, by adding additional entries to the write list 304a so long as the track ID value of any added entry is not less than the track ID value of any prior write command already sent to the target storage controller in the sequence of write commands for the write list 304a. For example, if an I/O write request is received from a host requesting writing of track write data at track ID14, an additional write list entry at write list position WLP2.1 (FIG. 3d) may be inserted for track ID14 as indicated by arrow A4 after the write list entry WLP2 for track ID13 but before the write list entry WLP3 for track ID15 so long as a write command for the write list entry for track ID15 has not yet been issued to the target storage controller 102b. Moreover, when a write command is prepared for the new write list entry for track ID14 of the expanded write list 304a, the write sort management 124a of the supervisory storage controller 102a determines (block 408, FIG. 4) that the monotonic sequence order has been maintained. As a result, the write sort management 124a can set (block 412, FIG. 4) the sort/no-sort indicator for the write command for track ID14 to indicate that a logarithmic time search for a write insertion point determination may be bypassed by the target storage controller 102b when adding an entry for track ID14 to an expanded target write list 308a.

Accordingly, returning to FIG. 6, upon receipt (block 608, FIG. 6) of a write command for the track write data for track ID14, the write sort management 124b of the target storage controller 102b inspects the sort/no-sort indicator field 508 (FIG. 5) of the write command block data structure of the write command for track ID14 and determines (block 612, FIG. 6) that the sort/no-sort indicator has been set to indicate that a write sort and more specifically in this embodiment, a logarithmic time search for a write list insertion point determination by the target storage controller is to be bypassed (block 612, FIG. 6) for the track write data for the track ID14. The write sort may be bypassed because the write list entry for the track ID14 has remained in monotonic sequence order in the initiator write list 304a. Accordingly, a target write list entry may be added as indicated at arrow A5 (FIG. 3e) for track ID14 at target write list position TWLP35 following target write list position TWLP34 for the last received prior write command for track ID13 as shown in FIG. 3e without conducting a logarithmic time search for a write insertion point determination. Upon receipt of a subsequent write command for track ID15, a write list entry may be added as indicated by arrow A6 for track ID15 at target write list position TWLP36 following target write list position TWLP35 for what is now the last received prior write command for track ID14 as shown in FIG. 3e without conducting a logarithmic time write list search for a write insertion point determination.

Conversely, if an I/O write request is received from a host requesting writing of track write data at track ID14, and a write command for the write list entry for track ID15 has already been issued to the target storage controller 102b, an additional write list entry would be added as indicated by arrow A7 (FIG. 3f) for track ID14 at write list position WLP4 after the write list entry WLP3 for track ID15, representing a decrease in track ID value from track ID15 to track ID14, instead of an increase. As a result, when a write command is prepared for the new write list entry for track ID14, the write sort management 124a of the supervisory storage controller 102a determines (block 408, FIG. 4) that the monotonic sequence order has not been maintained. Accordingly, the write sort management 124a of the supervisory storage controller 102a does not set (block 412, FIG. 4) the sort/no-sort indicator for the write command to indicate that a logarithmic time write list search for a write insertion point determination may be bypassed by the target storage controller 102b. On the contrary, the write sort management 124a of the supervisory storage controller 102a resets (block 420, FIG. 4) the sort/no-sort indicator for the write command to indicate that a write sort is to be conducted for a write insertion point determination by the target storage controller 102b because the monotonic sequence order of the write list 304a has not been maintained In one embodiment, the write sort to be conducted and not bypassed includes a logarithmic time write list search for purposes of determining a write list insertion point which will maintain the monotonic sequence order of the target write list 308a.

Accordingly, returning to FIG. 6, upon receipt (block 608, FIG. 6) of a write command for the track write data for track ID14, the write sort management 124b of the target storage controller 102b inspects the sort/no-sort indicator field 508 (FIG. 5) of the write command block data structure of the write command for track ID14 and determines (block 612, FIG. 6) that in this example, the sort/no-sort indicator has been reset to indicate that a write sort for this entry should not be bypassed but instead conducted. In this embodiment, a reset sort/no-sort indicator indicates that a write sort which includes a logarithmic time search for a write list insertion point determination by the target storage controller, is not to be bypassed but instead conducted (block 624, FIG. 6) for the track write data for the track ID14 because the write track entry for the track ID14 is not in monotonic sequence order in the initiator write list 304a. Accordingly, a write list entry may be inserted for track ID14 as indicated by arrow A8 (FIG. 3g) at target write list position TWLP34.1 following target write list position TWLP34 for track ID13 but before target write list position TWLP35 for track ID15. The target write list position TWLP34.1 is determined by a logarithmic time search of the target write list 308a so as to maintain monotonic sequence order for the expanded target write list 308a.

As noted above, in one embodiment, the write sort manager 124b of the target storage controller 102b may be operated in a mode or configuration in which a write list insertion point confirmation process is also bypassed (block 616, FIG. 6) for the currently received write command In another mode or embodiment, a write list insertion point confirmation process is not bypassed (block 616, FIG. 6) for the currently received write command Instead, the sort/no-sort indicator for a write command may be treated by the target storage controller more as a hint rather than a mandatory instruction to bypass any insertion point determination or confirmation. In this manner, a write list insertion point confirmation process provides flexibility in applications utilizing a sort/no-sort indicator in accordance with the present description.

Accordingly, in this embodiment, if a write list insertion point confirmation process is not to be bypassed (block 616, FIG. 6) for the currently received write command notwithstanding that the sort/no-sort indicator was determined (block 612, FIG. 6) to have been set, a determination is made (block 628, FIG. 6) to determine whether a write list insertion point after the previous entry of the target write list maintains the monotonic sequence order of the target write list 308a. In one embodiment, the confirmation made be made as a function of a write list search of the target write list, to determine whether inserting a new entry after a prior entry maintains the monotonic sequence order of the target write list.

For example, the track ID of the target write list entry to be added to the target write list 308a may be compared in a somewhat limited write list search to the track ID of the previously added target write list entry. If the track ID of the current entry to be added is greater in value than the previous target write list entry, it may be assumed that adding the current target write list entry after the previous target write list entry is confirmed (block 628, FIG. 6) as correct because the monotonic sequence order of the target write list 308a will be preserved following the addition of the current entry. Accordingly, the current target write list entry may be added (block 620) to the target write list 308a immediately after the position of the previous target write list entry without conducting a write sort such as a logarithmic binary search for the correct target write list insertion point. For example, before the entry at target write list position TWLP36 (FIG. 3e) is added to the target write list 308a as indicated at arrow A6, the target write list insertion point at arrow A6 may be confirmed by a limited search since the track ID15 of the entry at TWLP36 is greater than the track ID14 of the previously added target write list entry position TWLP35 and the monotonic sequence order of the target write list 308a is confirmed (block 628, FIG. 6) as maintained.

Conversely, if the track ID of the current entry to be added is determined by the limited search to be less in value than the previous target write list entry, it may be assumed that adding the current target write list entry after the previous target write list entry would not be correct because the monotonic sequence order of the target write list 308a will not be preserved following the addition of the current entry. Accordingly, in one embodiment, a limited search such as a sequential search may be continued over a predetermined range of entries, such as 2, 3 or more entries, for example, to confirm (block 632) whether the correct insertion point is within the limited range of entries at the end of the target write list as currently constituted. In one embodiment, a limited search may be limited by a maximum allowable search time for the limited search in which the maximum allowable time of the limited search is less than a worst case search time, for example. In another embodiment, a limited search may be limited to a maximum allowable number of elements which is less than the total number of elements of the write list to be searched, for example. Such limited searches may be referred to as constant or limited time searches since the search time may be constrained by the limits imposed on the search.

For example, if a write list insertion point confirmation process is not to be bypassed (block 616, FIG. 6) for the currently received write command and the currently received write command in this example is directed to track ID14 (FIG. 3g), it would be determined (block 628, FIG. 6) that a write list insertion point after the previous entry at target write list position TWLP35 of the target write list 308a is not correct because the monotonic sequence order of the target write list 308a would not be preserved (ID14 is less than ID15) following an addition of the current entry at the end of the target write list. Accordingly, a limited search such as limited time sequential search over a small range 308a' (FIG. 3g) of a few entries, may be conducted to confirm (block 632, FIG. 6) whether the correct insertion point is within the limited range 308a' of entries at the end of the target write list. In this example, the correct insertion point for the target write list entry for track ID14 may be determined by the limited time sequential search over the range 308a' to be after the target write list position TWLP34 but before the target write list position TWLP35 for track ID15, as represented by the arrow A8 for the insertion target write list position TWLP34.1 for the track ID14 of FIG. 3g. Accordingly, the write sort manager 124b of the target storage controller 102b proceeds to add (block 636, FIG. 6) the track write data for track ID 14 to the target write list 308a in an entry at the target write list position TWLP34.1 as indicated by arrow A8 in FIG. 3g, As another example, if a write list insertion point confirmation process is not to be bypassed (block 616, FIG. 6) for the currently received write command and the currently received write command in this example is directed to track ID08 (FIG. 3g), it would be determined (block 628, FIG. 6) that a write list insertion point after the previous entry (such as at target write list position TWLP35, for example) of the target write list 308a is not correct because the monotonic sequence order of the target write list 308a would not be preserved (track ID08 is less than track ID15) following an addition of the current entry at the end of the target write list. Accordingly, a limited search such as limited time sequential search over a small range 308a' (FIG. 3g) of a few entries, may be conducted to confirm (block 632, FIG. 6) whether the correct insertion point is within the limited range 308a' of entries at the end of the target write list. In this example, it would be determined (block 632, FIG. 6), by a limited search over the range 308a' (FIG. 3g) of target write list entries that the correct insertion point is not within the limited range 308a' of entries at the end of the target write list because the track ID08 of the currently received write command is less than the track ID of every entry within the range 308a'.

Accordingly, in one embodiment, a more extensive search may be performed (block 624, FIG. 6) outside the predetermined range 308a' of entries, to determine the correct write insertion point within the target write list 308a. As previously noted, a relatively few number of write list entries is depicted in the figures for purposes of simplicity. It is appreciated that in various applications such as large enterprise applications, the target write list entries may number in the hundreds, thousands or more. For such applications, it may be more efficient to select a logarithmic time search process rather than a sequential search process to identify the correct write list insertion point if the correct insertion point is not found within a limited range of entries at the current end of the target write list.

Accordingly, the write sort logic 12b of the target storage controller 102b performs (block 624, FIG. 6) a more extensive search of the target write list such as a logarithmic time search to identify the correct insertion point for the current write command for track ID08, which maintains the monotonic sequence order of the target write list 308a. In this example, the correct insertion point for the target write list entry for track ID08 may be determined to be as indicated by arrow A9 at target write list position TWLP32.1 which is located after the target write list position TWLP32 (FIG. 3g) for track ID07 but before the target write list position TWLP33 for track ID12. Accordingly, the write sort manager 124b of the target storage controller 102b proceeds to add (block 624, FIG. 6) the track write data for track ID08 to the target write list 308a at the determined insertion point which maintains the monotonic sequence order of the target write list 308a.

Figure 7:
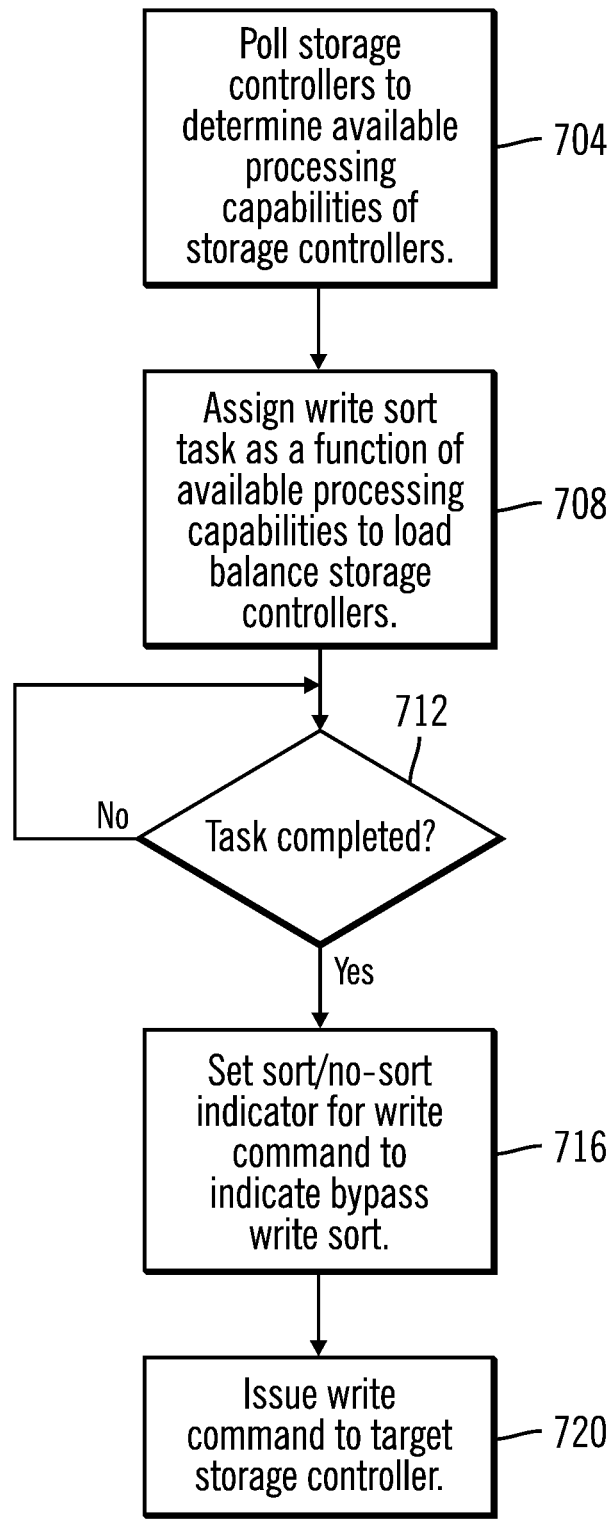
FIG. 7 illustrates, in a flowchart, an example of load sharing operations for write sort management in accordance with certain embodiments.

FIG. 7 depicts another example of operations 704-720 of a storage manager employing write sort management for load sharing in accordance with one embodiment of the present description. In this example, the storage managers of the storage controllers 102a, 102b, 102c including the associated write sort managers 124a, 124b, 124c, have been configured for write sort management operations which include load sharing. Although the logic performing the operations of FIG. 7 are described in connection with storage managers and associated write sort managers, it is appreciated that such write sort management operations may be located in other devices, such as a host, for example, depending upon the particular application.

In another aspect of write sort management in accordance with the present description, it is appreciated that one or more of the tasks described herein and related to write sorting of write lists of data units to be destaged to storage, may be distributed amongst plural storage controllers to achieve a more balanced load sharing amongst the various storage controllers. For example, the initiator write list 304a depicted in FIG. 3a need not be write sorted by the supervisory storage controller 102a but instead, a task of write sorting the write list to provide a monotonic sequence ordering for example, of the write list, may be assigned to another storage controller having greater availability of processing capacity.

In one embodiment, a write sort manager of a storage controller such as the supervisory storage controller 102a, for example, polls (block 704, FIG. 7) each the other storage controllers of the computing system of FIG. 1, including storage controllers 102b and 102c, to determine the available processing capacity of other storage controllers of the system. In one embodiment, polling may request each storage controller to respond to the polling by providing an indication of the available processing capacity of the storage controller being polled. For example, one storage controller having a lesser workload than another storage controller may report having a greater availability of unused or underutilized processing capacity as compared to other storage controllers of the system. As another example, one storage controller may have greater processing resources as compared to other storage controllers of the system, and as a result, may report having greater availability of unused or underutilized processing capacity as compared to other storage controllers of the system. Although determining the available processing capacity of various storage controllers is described herein as including polling storage controllers, it is appreciated that other techniques may be employed to determine the relative available processing capacities of plural storage controllers, depending upon the particular application.

Having determined (block 704, FIG. 7) the relative available processing capacities of various storage controllers of the system, the write sort manager 124a of the storage controller 102a conducting the poll selects a storage controller having greater availability of processing capability as compared to other storage controllers of the system and assigns (block 708, FIG. 7) a write sort task to the selected storage controller. In this manner, a write sort task may be assigned to another storage controller as a function of available processing capacity to improve load balancing among the storage controllers. For example, if the initiator storage controller 102a has less available processing capacity as compared to the storage controller 102b, assigning a write sort task to be performed by the storage controller 102b rather than being performed by the initiator storage controller 102a, improves the balance of loads of the storage controllers 102a and 102b by making the balance of loads more even.

Upon completion (block 712, FIG. 7) of the assigned write sort task, a sequence of write commands may be generated based upon the write sorted initiator write list 304a, and issued in a manner similar to that described above in connection with FIG. 4. Accordingly, a write sort manager such as the write sort manager 124a sets (block 716, FIG. 7) a sort/no-sort indicator to be transmitted to the target storage controller in association with each write command, to indicate to the target storage controller that a write sort need not be performed for the entry for the data unit of the write command. At an appropriate point following completion of a write command, the completed write command is issued (block 720, FIG. 7) to the target storage controller which is the primary storage controller 102a in this example.

It is appreciated that variety of write sorting related tasks may be redistributed among plural storage controllers employing write sort management in accordance with the present description, One example described above relates to assigning a write sort of the initiator write list 304a (FIG. 3a) so that the write sort is performed by a storage controller other than the initiator storage controller 102a. Such a write sort may sort the entries of the initiator write list 304a to be in a monotonic sequence order as described above in connection with FIG. 4. Such sorting may be achieved with any suitable sorting technique including binary, sequential, logarithmic time, limited time, radix and/or linear searches to determine appropriate entry insertion points to maintain a monotonic sequence order. Other write list search techniques may be employed, depending upon the particular application.

Similarly, another example of an assignable write sort task includes assigning a write sort of the target write list 308a (FIG. 3a) so that the write sort is performed by a storage controller other than the target storage controller 102b to improve load balancing. Such a write sort may be used for example, to determine an appropriate entry insertion point to ensure that the entries of the target write list 308a remain in a monotonic sequence order as described above in connection with block 624 of FIG. 6, for example. Here too, such sorting may be achieved with any suitable sorting technique including binary, sequential, logarithmic time, limited time, radix and/or linear searches to determine appropriate entry insertion points to maintain a monotonic sequence order before data units of the target write list are destaged to storage. Other write list search techniques may be employed, depending upon the particular application.

Other write sort related tasks may be assigned from one storage controller to another to improve load balancing. For example, a task of generation of a sequence of write commands based upon a write sorted initiator write list, may be assigned from the initiator storage controller to another storage controller, depending upon available processing capacities of the storage controllers. Such an assigned task may include setting (block 716, FIG. 7) a sort/no-sort indicator to be transmitted to a target storage controller in association with a write command of the sequence of commands, to indicate to the target storage controller that a write sort for determining an insertion point for a write data unit of a write command in a target write list of write data units of the target storage controller may be bypassed at the target storage controller as a function of the sort/no-sort indicator. Additional examples of assignable write sort related tasks include the issuing (block 720, FIG. 7) of completed write commands of a sequence of write commands to the target storage controller.

In the illustrated embodiment, the storage managers of the storage controllers 102a, 102b, 102c implementing write sort management in accordance with the present description, are depicted as software stored in a memory and executed by a processor of the storage controller. However, it is appreciated that the write sort management logic functions, may be implemented as hardware, software, firmware or any combination of one or more thereof, depending upon the particular application. In addition, logic functions of write sort management may be implemented in a host or storage in addition to or instead of a storage controller.

In certain embodiments, the memories including caches of the storage controllers may comprise a high cost and very low latency device such as a Dynamic Random Access Memory (DRAM) or Static Random Access Memory (SRAM), and less expensive and higher latency and higher capacity storage devices such as non-volatile random access memory (NVRAM), including Magnetoresistive Random Access Memory (MRAM), Phase Change Memory (PCM), Resistive Random Access Memory (RRAM), spin transfer torque memory (STM-RAM), conductive bridging RAM (CBRAM), NAND memory devices, such as flash memory and solid state drives (SSDs), etc. In certain embodiments, the memories may have different endurance profiles with different number of available erase cycles, such that higher levels of the memories allow for a greater number of erase cycles, i.e., greater endurance, than the lower levels of the memories.

The storage 101a, 101b, 101c may comprise one or more storage devices known in the art, such as a solid state storage device (SSD), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The storage devices of the storage 101a, 101b, 101c may be configured to store data in units or subunits of data storage such as tracks, extents, blocks, pages, segments, cylinders, volumes, etc. Although write sort management in accordance with the present description are described in connection with storage units such as tracks, it is appreciated that write sort management in accordance with the present description is applicable to other storage units and subunits such as sectors, cylinders, volumes, extents, blocks, pages, segments, etc.

The network 111 represents one or more networks which may comprise a Storage Area Network (SAN), a Local Area Network (LAN), a Wide Area Network (WAN), the Internet, and Intranet, etc. In addition, the network 111 may further include direct connections between components. For example, one or more storage controllers may be connected to each other by dedicated connections. As another example, the hosts 108 . . . 110 may connect to the storage controller 102 over a bus interface, such as a Peripheral Component Interconnect (PCI) bus interface and other interfaces known in the art.

Figure 8:
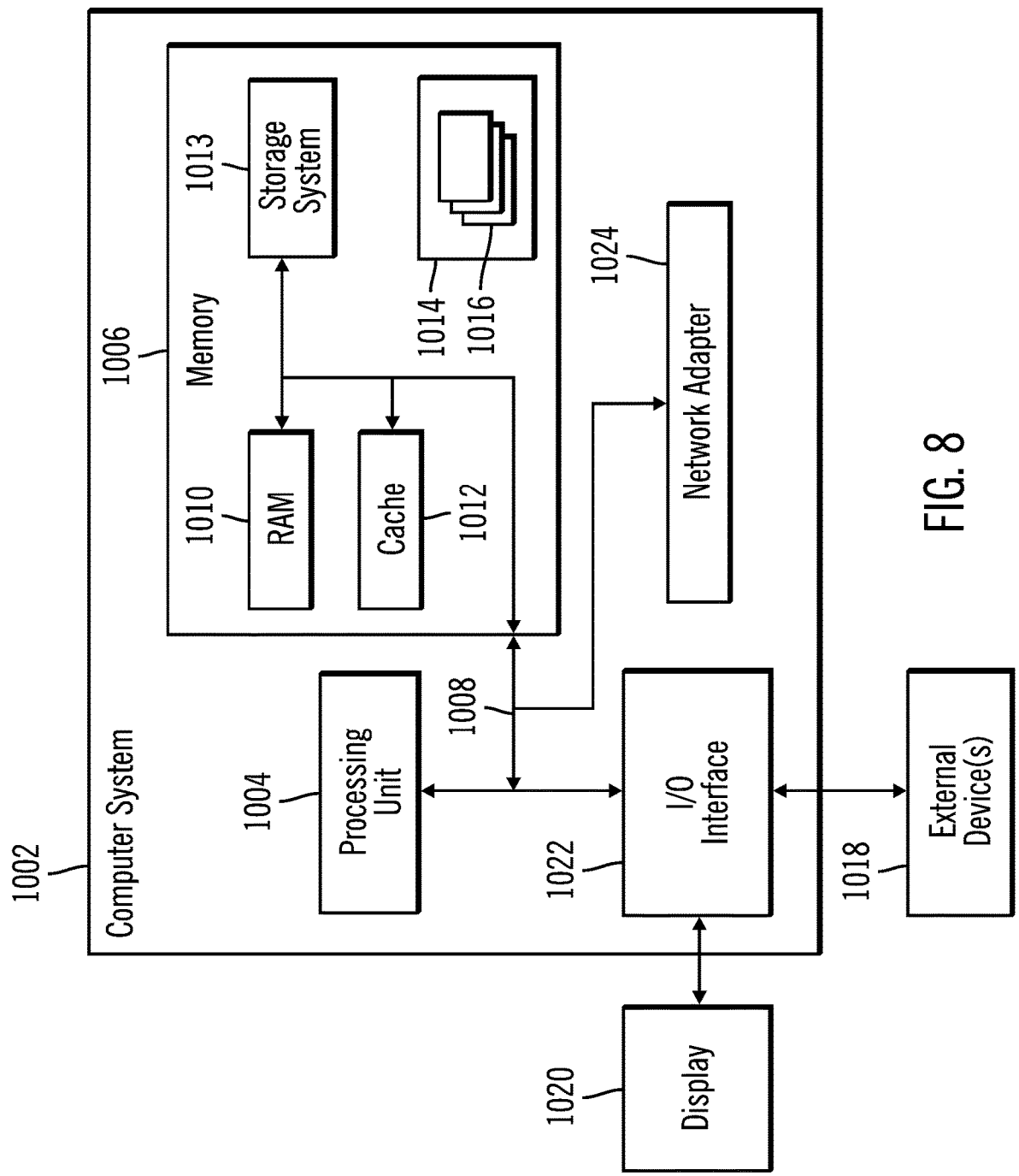
FIG. 8 illustrates, in a block diagram, a computer system employing write sort management in accordance with certain embodiments.

The computational components of the figures may each be implemented in one or more computer systems, such as the computer system 1002 shown in FIG. 8.

The computer system 1002 may be a computer system, which is operational with numerous other general purpose or special purpose computing system environments or configurations. Examples of well-known computing systems, environments, and/or configurations that may be suitable for use with computer system 1002 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself. The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

EXAMPLES

The following pertains to further embodiments.

Example 1 is a method comprising operations for destaging data from a cache to storage including preparing a write command to be issued to a target storage controller wherein the write command identifies a write data unit of a first write list of write data units to be written to storage locations of storage, and the storage locations at which the write data unit of the first write list is to be stored. A determination is made in a sort/no-sort determination prior to issuing the write command to the target storage controller as to whether an insertion point for the write data unit of the write command in a target write list of write data units of the target storage controller is to be determined as a function of a first write list search. Thus, the first write list search may be selectively one of performed and bypassed at the target storage controller as a function of the sort/no-sort determination.

In Example 2, the subject matter of Example 1 can optionally include wherein entries of the target write list are ordered as a function of storage location identified by each entry, in a monotonic sequence order of storage location identifications. The first write list search for a write list insertion point determination includes a search of the entries of the target write list to determine a write list insertion point which maintains the monotonic sequence order after an entry is inserted into the target write list.

In Example 3, the subject matter of Examples 1-2 can optionally include wherein the preparing the write command includes setting a sort/no-sort indicator to be transmitted to the target storage controller in association with the write command, to indicate to the target storage controller whether an insertion point for the write data unit of the write command in the target write list of write data units of the target storage controller is to be determined as a function of a write list search so that the write list search may be selectively one of performed and bypassed at the target storage controller as a function of the sort/no-sort indicator.

In Example 4, the subject matter of Examples 1-3 can optionally include wherein the write command includes a write command data structure and the setting the sort/no-sort indicator includes setting a Boolean value within the write command data structure to indicate as a function of the Boolean value, whether an insertion point for the write data unit of the write command in the target write list of write data units of the target storage controller is to be determined as a function of a write list search so that the write list search may be selectively one of performed and bypassed at the target storage controller as a function of the sort/no-sort indicator.

In Example 5, the subject matter of Examples 1-4 can optionally include wherein the write command is in a sequence of write commands including a first write command and a second write command, in which the sequence of write commands is prepared for the first write list, the method further comprising operations for receiving by the target storage controller the first write command from a first processing unit and placing a write data unit of the first write command in a first entry of the target write list, receiving the second write command from the first processing unit and in response to receipt of the second write command and the associated sort/no-sort indicator of the second write command indicating that the write list search may be bypassed for the write data unit of the second write command, bypassing the write list search for the write data unit of the second write command, and inserting the write data unit of the second write command at a second entry of the target write list.

In Example 6, the subject matter of Examples 1-5 can optionally include wherein the second entry is positioned after the first entry wherein the monotonic sequence order of the target write list is maintained after the second entry is inserted into the target write list after the first entry.

In Example 7, the subject matter of Examples 1-6 can optionally include an operation for, prior to inserting the write data unit of the second write command at the second entry of the target write list, confirming as a function of a write list search of the target write list, whether inserting a second entry after the first entry maintains the monotonic sequence order of the target write list.

In Example 8, the subject matter of Examples 1-7 can optionally include an operation for, in response to confirming that inserting the second entry after the first entry does not maintain the monotonic sequence order of the target write list, confirming as a function of a write list search of the target write list within a predetermined range of entries, whether inserting the second entry at an insertion point within the predetermined range of entries of the target write list maintains the monotonic sequence order of the target write list.

In Example 9, the subject matter of Examples 1-8 can optionally include an operation for, in response to confirming that inserting the second entry at an insertion point within the predetermined range of entries of the target write list does not maintain the monotonic sequence order of the target write list, determining in a search of the entries of the target write list outside the predetermined range of entries of the target write list, a write list insertion point for the second entry which maintains the monotonic sequence order after the second entry is inserted into the target write list.

Example 10 is a method for destaging data from a cache to storage which includes determining available processing capacities of each of a plurality of storage controllers. Assigned to a storage controller of the plurality of storage controllers, as a function of available processing capacities of each of the plurality of storage controllers, is a write sort task of write sorting a write list of data units to be destaged to storage.

In Example 11, the subject matter of Example 10 can optionally include wherein determining available processing capacities of each of the plurality of storage controllers includes polling each of the plurality of storage controllers to request the available processing capacities of each of the polled plurality of storage controllers.

In Example 12, the subject matter of Examples 10-11 can optionally include wherein write sort task assigning to a storage controller of the plurality of storage controllers includes load balancing loads of the plurality of storage controllers.

In Example 13, the subject matter of Examples 10-12 can optionally include wherein the write list to be write sorted by the write sort task is an initiator write list for generating a sequence of write commands to be issued to a target storage controller for destaging data units of the initiator write list to storage controlled by the target storage controller.

In Example 14, the subject matter of Examples 10-13 can optionally include wherein the write sort task includes write sorting entries of the initiator write list as a function of a storage location identified by each entry, in a monotonic sequence order of storage location identifications of the initiator write list entries.

In Example 15, the subject matter of Examples 10-14 can optionally include wherein the assigned write sort task includes at least one of a logarithmic time search and a sequential search of the initiator write list to determine an initiator write list insertion point which maintains a monotonic sequence order after an entry is inserted into the target write list.

In Example 16, the subject matter of Examples 10-15 can optionally include wherein the write sort task includes setting a sort/no-sort indicator to be transmitted to a target storage controller in association with a write command of the sequence of commands, to indicate to the target storage controller that a determination of an insertion point for a write data unit of a write command in a target write list of write data units of the target storage controller may be bypassed at the target storage controller as a function of the sort/no-sort indicator.

In Example 17, the subject matter of Examples 10-16 can optionally include wherein the write list to be write sorted by the write sort task is a target write list for generating a sequence of destaging operations for destaging data units of the target write list to storage controlled by the target storage controller.

In Example 18, the subject matter of Examples 10-17 can optionally include wherein the assigned write sort task includes at least one of a logarithmic time search and a limited time search of the target write list to determine a target write list insertion point which maintains a monotonic sequence order after an entry is inserted into the target write list.

In Example 19, the subject matter of Examples 10-18 can optionally include the subject matter of Examples 1-9.

Example 20 is a system comprising one or more processors and one or more computer-readable storage media collectively storing program instructions which, when executed by one or more processors, are configured to cause one or more processors to perform the operations according to any of Examples 1 through 19.

Example 21 is a computer program product comprising one or more computer readable storage media, and program instructions collectively stored on the one or more computer readable storage media, the program instructions comprising instructions configured to cause one or more processors to perform the operations according to any one of Examples 1 through 19.

Example 22 is a device comprising one or more means for performing the operations according to any one of Examples 1 through 19.

What is claimed is:

1. A computer program product, the computer program product comprising a computer readable storage medium having program code embodied therewith, the program code executable by at least one processor of a computer system having a first processing unit, storage and a storage controller controlling the storage, to perform operations, the operations comprising:
   destaging data from a cache to storage including:
      preparing a write command to be issued to a target storage controller wherein the write command identifies a write data unit of a first write list of write data units to be written to storage locations of storage, and the storage locations at which the write data unit of the first write list is to be stored;
      determining in a sort/no-sort determination prior to issuing the write command to the target storage controller whether an insertion point for the write data unit of the write command in a target write list of write data units of the target storage controller is to be determined as a function of a first write list search; and
      in response to the sort/no sort determination, transmitting a sort/no-sort indicator to the target storage controller in association with the write command, to indicate to the target storage controller whether an insertion point for the write data unit of the write command in the target write list of write data units of the target storage controller is to be determined as a function of a write list search at the target storage controller wherein the first write list search may be selectively one of performed and bypassed at the target storage controller as a function of the sort/no sort indicator and the sort/no-sort determination.

2. The computer program product of claim 1 wherein entries of the target write list are ordered as a function of storage location identified by each entry, in a monotonic sequence order of storage location identifications and the first write list search for a write list insertion point determination includes a search of the entries of the target write list to determine a write list insertion point which maintains the monotonic sequence order after an entry is inserted into the target write list.

3. The computer program product of claim 2, wherein the preparing the write command includes setting a sort/no-sort indicator to be transmitted to the target storage controller in association with the write command, to indicate to the target storage controller whether an insertion point for the write data unit of the write command in the target write list of write data units of the target storage controller is to be determined as a function of a write list search so that the write list search may be selectively one of performed and bypassed at the target storage controller as a function of the sort/no-sort indicator.

4. The computer program product of claim 3 wherein the write command includes a write command data structure and the setting the sort/no-sort indicator includes setting a Boolean value within the write command data structure to indicate as a function of the Boolean value, whether an insertion point for the write data unit of the write command in the target write list of write data units of the target storage controller is to be determined as a function of a write list search so that the write list search may be selectively one of performed and bypassed at the target storage controller as a function of the sort/no-sort indicator.

5. The computer program product of claim 3 wherein the write command is in a sequence of write commands including a first write command and a second write command, in which the sequence of write commands is prepared for the first write list, the operations further comprising receiving by the target storage controller the first write command from a first processing unit and placing a write data unit of the first write command in a first entry of the target write list, receiving the second write command from the first processing unit and in response to receipt of the second write command and the associated sort/no-sort indicator of the second write command indicating that the write list search may be bypassed for the write data unit of the second write command, bypassing the write list search for the write data unit of the second write command, and inserting the write data unit of the second write command at a second entry of the target write list.

6. The computer program product of claim 5 wherein the second entry is positioned after the first entry wherein the monotonic sequence order of the target write list is maintained after the second entry is inserted into the target write list after the first entry.

7. The computer program product of claim 5 wherein the operations further comprise, prior to inserting the write data unit of the second write command at the second entry of the target write list, confirming as a function of a write list search of the target write list, whether inserting the second entry after the first entry maintains the monotonic sequence order of the target write list.

8. The computer program product of claim 7 wherein the operations further comprise in response to confirming that inserting the second entry after the first entry does not maintain the monotonic sequence order of the target write list, confirming as a function of a limited write list search of the target write list within a predetermined range of entries, whether inserting the second entry at an insertion point within the predetermined range of entries of the target write list maintains the monotonic sequence order of the target write list.

9. The computer program product of claim 8 wherein the operations further comprise in response to confirming that inserting the second entry at an insertion point within the predetermined range of entries of the target write list does not maintain the monotonic sequence order of the target write list, determining in a logarithmic time search of the entries of the target write list including entries outside the predetermined range of entries of the target write list, a write list insertion point for the second entry which maintains the monotonic sequence order after the second entry is inserted into the target write list.

10. A method, comprising:
   destaging data from a cache to storage including:
      preparing a write command to be issued to a target storage controller wherein the write command identifies a write data unit of a first write list of write data units to be written to storage locations of storage, and the storage locations at which the write data unit of the first write list is to be stored;

determining in a sort/no-sort determination prior to issuing the write command to the target storage controller whether an insertion point for the write data unit of the write command in a target write list of write data units of the target storage controller is to be determined as a function of a first write list search; and in response to the sort/no sort determination, transmitting a sort/no-sort indicator to the target storage controller in association with the write command, to indicate to the target storage controller whether an insertion point for the write data unit of the write command in the target write list of write data units of the target storage controller is to be determined as a function of a write list search at the target storage controller wherein the first write list search may be selectively one of performed and bypassed at the target storage controller as a function of the sort/no sort indicator and the sort/no-sort determination.

11. The method of claim 10 wherein entries of the target write list are ordered as a function of storage location identified by each entry, in a monotonic sequence order of storage location identifications and the first write list search for a write list insertion point determination includes a search of the entries of the target write list to determine a write list insertion point which maintains the monotonic sequence order after an entry is inserted into the target write list.

12. The method of claim 11, wherein the preparing the write command includes setting a sort/no-sort indicator to be transmitted to the target storage controller in association with the write command, to indicate to the target storage controller whether an insertion point for the write data unit of the write command in the target write list of write data units of the target storage controller is to be determined as a function of a write list search so that the write list search may be selectively one of performed and bypassed at the target storage controller as a function of the sort/no-sort indicator.

13. The method of claim 12 wherein the write command includes a write command data structure and the setting the sort/no-sort indicator includes setting a Boolean value within the write command data structure to indicate as a function of the Boolean value, whether an insertion point for the write data unit of the write command in the target write list of write data units of the target storage controller is to be determined as a function of a write list search so that the write list search may be selectively one of performed and bypassed at the target storage controller as a function of the sort/no-sort indicator.

14. The method of claim 12 wherein the write command is in a sequence of write commands including a first write command and a second write command, in which the sequence of write commands is prepared for the first write list, the method further comprising receiving by the target storage controller the first write command from a first processing unit and placing a write data unit of the first write command in a first entry of the target write list, receiving the second write command from the first processing unit and in response to receipt of the second write command and the associated sort/no-sort indicator of the second write command indicating that the write list search may be bypassed for the write data unit of the second write command, bypassing the write list search for the write data unit of the second write command, and inserting the write data unit of the second write command at a second entry of the target write list.

15. The method of claim 14 wherein the second entry is positioned after the first entry wherein the monotonic sequence order of the target write list is maintained after the second entry is inserted into the target write list after the first entry.

16. The method of claim 14 further comprise, prior to inserting the write data unit of the second write command at the second entry of the target write list, confirming as a function of a write list search of the target write list, whether inserting the second entry after the first entry maintains the monotonic sequence order of the target write list.

17. The method of claim 16 further comprise in response to confirming that inserting the second entry after the first entry does not maintain the monotonic sequence order of the target write list, confirming as a function of a write list search of the target write list within a predetermined range of entries, whether inserting the second entry at an insertion point within the predetermined range of entries of the target write list maintains the monotonic sequence order of the target write list.

18. The method of claim 17 further comprise in response to confirming that inserting the second entry at an insertion point within the predetermined range of entries of the target write list does not maintain the monotonic sequence order of the target write list, determining in a logarithmic time search of the entries of the target write list including entries outside the predetermined range of entries of the target write list, a write list insertion point for the second entry which maintains the monotonic sequence order after the second entry is inserted into the target write list.

19. A system, comprising:

a host configured to issue input/output (I/O) requests:

a processing unit configured to issue write commands in response to an I/O request;

a storage having storage locations; and a target storage controller having a memory for a target write list of entries of write data units, the target storage controller configured to control the storage in response to write commands;

wherein at least one of the host, processing unit and storage controller has a cache having a write list of write data units, at least one processor and at least one computer program product, the computer program product comprising a computer readable storage medium having program code embodied therewith, the program code executable by at least one processor of the system to perform operations, the operations comprising:

destaging data from the cache to storage including:

preparing a write command to be issued to a target storage controller wherein the write command identifies a write data unit of a first write list of write data units to be written to storage locations of storage, and the storage locations at which the write data unit of the first write list is to be stored;

determining in a sort/no-sort determination prior to issuing the write command to the target storage controller whether an insertion point for the write data unit of the write command in a target write list of write data units of the target storage controller is to be determined as a function of a first write list search; and in response to the sort/no sort determination, transmitting a sort/no-sort indicator to the target storage controller in association with the write command, to indicate to the target storage controller whether an insertion point for the write data unit of the write command in the target write list of write data units of the target storage controller is to be determined as a function of a write list search at the target storage controller wherein the first write list search may be selectively one of performed and bypassed at the target storage controller as a function of the sort/no sort indicator and the sort/no-sort determination.

20. The system of claim 19 wherein entries of the target write list identify a storage location and are ordered as a function of storage location identified by each entry, in a monotonic sequence order of storage location identifications and the first write list search for a write list insertion point determination includes a search of the entries of the target write list to determine a write list insertion point which maintains the monotonic sequence order after an entry is inserted into the target write list.

21. The system of claim 20, wherein the preparing the write command includes setting a sort/no-sort indicator to be transmitted to the target storage controller in association with the write command, to indicate to the target storage controller whether an insertion point for the write data unit of the write command in the target write list of write data units of the target storage controller is to be determined as a function of a write list search so that the write list search may be selectively one of performed and bypassed at the target storage controller as a function of the sort/no-sort indicator.

22. The system of claim 21 wherein the write command includes a write command data structure and the setting the sort/no-sort indicator includes setting a Boolean value within the write command data structure to indicate as a function of the Boolean value, whether an insertion point for the write data unit of the write command in the target write list of write data units of the target storage controller is to be determined as a function of a write list search so that the write list search may be selectively one of performed and bypassed at the target storage controller as a function of the sort/no-sort indicator.

23. The system of claim 21 wherein the write command is in a sequence of write commands including a first write command and a second write command, in which the sequence of write commands is prepared for the first write list, the operations further comprising receiving by the target storage controller the first write command from a first processing unit and placing a write data unit of the first write command in a first entry of the target write list, receiving the second write command from the first processing unit and in response to receipt of the second write command and the associated sort/no-sort indicator of the second write command indicating that the write list search may be bypassed for the write data unit of the second write command, bypassing the write list search for the write data unit of the second write command, and inserting the write data unit of the second write command at a second entry of the target write list.

24. The system of claim 23 wherein the second entry is positioned after the first entry wherein the monotonic sequence order of the target write list is maintained after the second entry is inserted into the target write list after the first entry.

25. The system of claim 23 wherein the operations further comprise:
prior to inserting the write data unit of the second write command at the second entry of the target write list, confirming as a function of a write list search of the target write list, whether inserting the second entry after the first entry maintains the monotonic sequence order of the target write list;
in response to confirming that inserting the second entry after the first entry does not maintain the monotonic sequence order of the target write list, confirming as a function of a write list search of the target write list within a predetermined range of entries, whether inserting the second entry at an insertion point within the predetermined range of entries of the target write list maintains the monotonic sequence order of the target write list; and
in response to confirming that inserting the second entry at an insertion point within the predetermined range of entries of the target write list does not maintain the monotonic sequence order of the target write list, determining in a logarithmic time search of the entries of the target write list including entries outside the predetermined range of entries of the target write list, a write list insertion point for the second entry which maintains the monotonic sequence order after the second entry is inserted into the target write list.

* * * * *